United States Patent
Goetz et al.

(10) Patent No.: US 12,190,323 B1
(45) Date of Patent: Jan. 7, 2025

(54) ENHANCED DRIVE-UP EXPERIENCE—TELLER JOURNEY

(71) Applicant: Wells Fargo Bank, N.A., San Francisco, CA (US)

(72) Inventors: Darren M. Goetz, Salinas, CA (US); Corey Michael Heaton, San Francisco, CA (US); Amy J. Schmitt, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/555,047

(22) Filed: Dec. 17, 2021

(51) Int. Cl.
*G06Q 20/40* (2012.01)
*G06Q 10/0631* (2023.01)
*G06Q 40/02* (2023.01)
*H04W 4/029* (2018.01)

(52) U.S. Cl.
CPC ......... *G06Q 20/40145* (2013.01); *G06Q 10/063112* (2013.01); *G06Q 40/02* (2013.01); *H04W 4/029* (2018.02)

(58) Field of Classification Search
CPC ..... G06Q 20/40145; G06Q 10/063112; G06Q 40/02; H04W 4/029
See application file for complete search history.

(56) References Cited

U.S. PATENT DOCUMENTS

| | | | | |
|---|---|---|---|---|
| 5,097,328 | A * | 3/1992 | Boyette | G08B 13/19602 348/150 |
| 6,636,598 | B1 * | 10/2003 | Thomson | H04M 3/5232 379/266.08 |
| 7,506,819 | B2 | 3/2009 | Beenau et al. | |
| 7,640,212 | B2 | 12/2009 | Rodin | |
| 8,548,912 | B2 | 10/2013 | Cincera | |
| 9,355,530 | B1 | 5/2016 | Block et al. | |
| 9,380,421 | B1 | 6/2016 | Vltavsky | |

(Continued)

OTHER PUBLICATIONS

Sun, et al., "iCARE: A framework for big data-based banking customer analytics," IBM Journal of Research and Development 58(5/6), pp. 4:1-4:9 (2014).

*Primary Examiner* — Christine M Behncke
*Assistant Examiner* — Henry H Jung
(74) *Attorney, Agent, or Firm* — Foley & Lardner LLP

(57) ABSTRACT

Systems and methods an enhanced drive-up banking experience with automatic authentication are provided herein. The system includes a communication interface structured to communicatively couple to a network, sensors, a processor, and memory. The system performs operations including receive a first pre-staged transaction request for a first pre-staged transaction, from a user device; detect, by the one or more sensors, that the user device has entered a first geolocation area; determine a first provider employee of a plurality of provider employees to process the pre-staged transaction; add the pre-staged transaction to a first dynamic service queue, the first dynamic service queue corresponding to the first provider employee; display a teller user interface on a teller device, the teller user interface comprising at least the dynamic service queue; verify, by an authentication circuit, the pre-staged transaction; responsive to verifying the pre-staged transaction, complete, by a transaction device management circuit, the pre-staged transaction.

17 Claims, 7 Drawing Sheets

(56) References Cited

U.S. PATENT DOCUMENTS

| | | |
|---|---|---|
| 9,432,804 B2 | 8/2016 | Hanson et al. |
| 9,501,765 B2 | 11/2016 | Grigg et al. |
| 9,508,070 B2 | 11/2016 | Grigg et al. |
| 9,666,037 B2 | 5/2017 | Dent |
| 10,373,148 B1* | 8/2019 | Dixon .................... G06Q 20/22 |
| 10,509,949 B1 | 12/2019 | Mossoba et al. |
| 10,560,799 B1 | 2/2020 | Vltavsky |
| 10,776,613 B1 | 9/2020 | Schneider et al. |
| 10,963,851 B2 | 3/2021 | Block et al. |
| 11,062,390 B2 | 7/2021 | Mathwig et al. |
| 11,100,764 B1 | 8/2021 | Dant |
| 11,348,077 B2 | 5/2022 | Naik et al. |
| 2008/0114697 A1 | 5/2008 | Black et al. |
| 2012/0124483 A1 | 5/2012 | Zuckerberg et al. |
| 2012/0164989 A1 | 6/2012 | Xiao et al. |
| 2012/0259782 A1* | 10/2012 | Hammad ........... G06Q 20/3674<br>705/44 |
| 2012/0316992 A1 | 12/2012 | Oborne |
| 2015/0006243 A1 | 1/2015 | Yuasa |
| 2015/0066519 A1* | 3/2015 | Lin ........................ G06Q 50/10<br>705/1.1 |
| 2015/0088546 A1* | 3/2015 | Balram .................. G16H 10/60<br>705/3 |
| 2015/0287017 A1 | 10/2015 | Iqbal et al. |
| 2015/0294322 A1 | 10/2015 | Grigg et al. |
| 2015/0302415 A1* | 10/2015 | Reines ................. G06Q 30/016<br>705/7.19 |
| 2017/0243410 A1 | 8/2017 | Caballero |
| 2017/0287021 A1* | 10/2017 | Gilbertson ............. G06Q 40/02 |
| 2018/0165663 A1* | 6/2018 | Naik .................. G06Q 20/3223 |
| 2019/0295055 A1 | 9/2019 | Kuchenski et al. |
| 2020/0005261 A1 | 1/2020 | Arora et al. |
| 2020/0067917 A1 | 2/2020 | McBain et al. |
| 2021/0042673 A1* | 2/2021 | Lieberman ......... G06Q 10/0633 |
| 2021/0272081 A1 | 9/2021 | Kuchenski et al. |
| 2023/0095391 A1* | 3/2023 | Costello ................. G06V 20/41<br>705/16 |

* cited by examiner

ENHANCED DRIVE-UP EXPERIENCE—TELLER JOURNEY

TECHNICAL FIELD

The present disclosure relates to apparatuses, systems, and methods for an enhanced drive-up experience. More specifically, aspects of the present disclosure relate to automatic financial institution customer authentication in drive-up banking arrangements. Further aspects of the present disclosure relate to remote transaction pre-staging. Further aspects of the present disclosure relate to load balancing at drive-up banking outlets. Aspects of the present disclosure further relate to computing systems that enable customer and/or teller user experience in the drive-up banking scenarios described herein.

BACKGROUND

Automated teller machines (ATMs) are a convenient way for customers to complete financial transactions, including document deposits, banknote deposits and the like. However, some transactions are performed with a financial institution employee, such as a teller due to transaction complexity and/or customer authentication requirements. Such transactions may take longer and/or may require additional identity verification compared to financial transaction performed at an ATM. For example, the transaction may include passing physical transaction media (e.g., banknotes, checks, bank cards, payment cars, and so on), identification documents, transaction documents, and the like between a customer and a financial institution employee. Accordingly, a financial institution employee may be required to manually authenticate the customer and/or approve the transaction.

SUMMARY OF THE INVENTION

At least one arrangement relates to a system. The system includes one or more sensors, one or more processors, and memory having instructions stored in non-transitory machine-readable media that, when executed by the one or more processors, cause the one or more processors to perform operations. The operations include receive, by a user device management circuit, a first pre-staged transaction request for a first pre-staged transaction, from a user device. The operations also include detect, by the one or more sensors, that the user device has entered a first geolocation area. The operations also include determine, by a provider team management circuit, a first provider employee of a plurality of provider employees to process the pre-staged transaction. The operations also include add, by a provider device management circuit, the pre-staged transaction to a first dynamic service queue, the first dynamic service queue corresponding to the first provider employee. The operations also include display, by the provider device management circuit, a teller user interface on a teller device, the teller user interface comprising at least the dynamic service queue. The operations also include verify, by an authentication circuit, the pre-staged transaction. The operations also include responsive to verifying the pre-staged transaction, complete, by a transaction device management circuit, the pre-staged transaction.

Another arrangement relates to a computer implemented method of executing pre-staged transactions. The method includes receiving, by a user device management circuit, a first pre-staged transaction request for a first pre-staged transaction, from a user device. The method also includes detecting, by one or more sensors, that the user device has entered a first geolocation area. The method also includes determining, by a provider team management circuit, a first provider employee of a plurality of provider employees to process the pre-staged transaction. The method also includes The method also includes adding, by a provider device management circuit, the pre-staged transaction to a first dynamic service queue, the first dynamic service queue corresponding to the first provider employee. The method also includes displaying, by the provider device management circuit, a teller user interface on a teller device, the teller user interface comprising at least the dynamic service queue. The method also includes verifying, by an authentication circuit, the pre-staged transaction. The method also includes responsive to verifying the pre-staged transaction, completing, by a transaction device management circuit, the pre-staged transaction.

Another arrangement relates to a non-transitory computer readable medium having computer-executable instructions embodied therein that, when executed by at least one processor of a computing system, cause the computing system to perform operations to execute a pre-staged transaction. The operations include receive, by a user device management circuit, a first pre-staged transaction request for a first pre-staged transaction, from a user device. The operations also include detect, by one or more sensors, that the user device has entered a first geolocation area. The operations also include determine, by a provider team management circuit, a first provider employee of a plurality of provider employees to process the pre-staged transaction. The operations also include add, by a provider device management circuit, the pre-staged transaction to a first dynamic service queue, the first dynamic service queue corresponding to the first provider employee. The operations also include display a teller user interface on a teller device, the teller user interface comprising at least the dynamic service queue. The operations also include verify, by an authentication circuit, the pre-staged transaction. The operations also include responsive to verifying the pre-staged transaction, complete, by a transaction device management circuit, the pre-staged transaction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
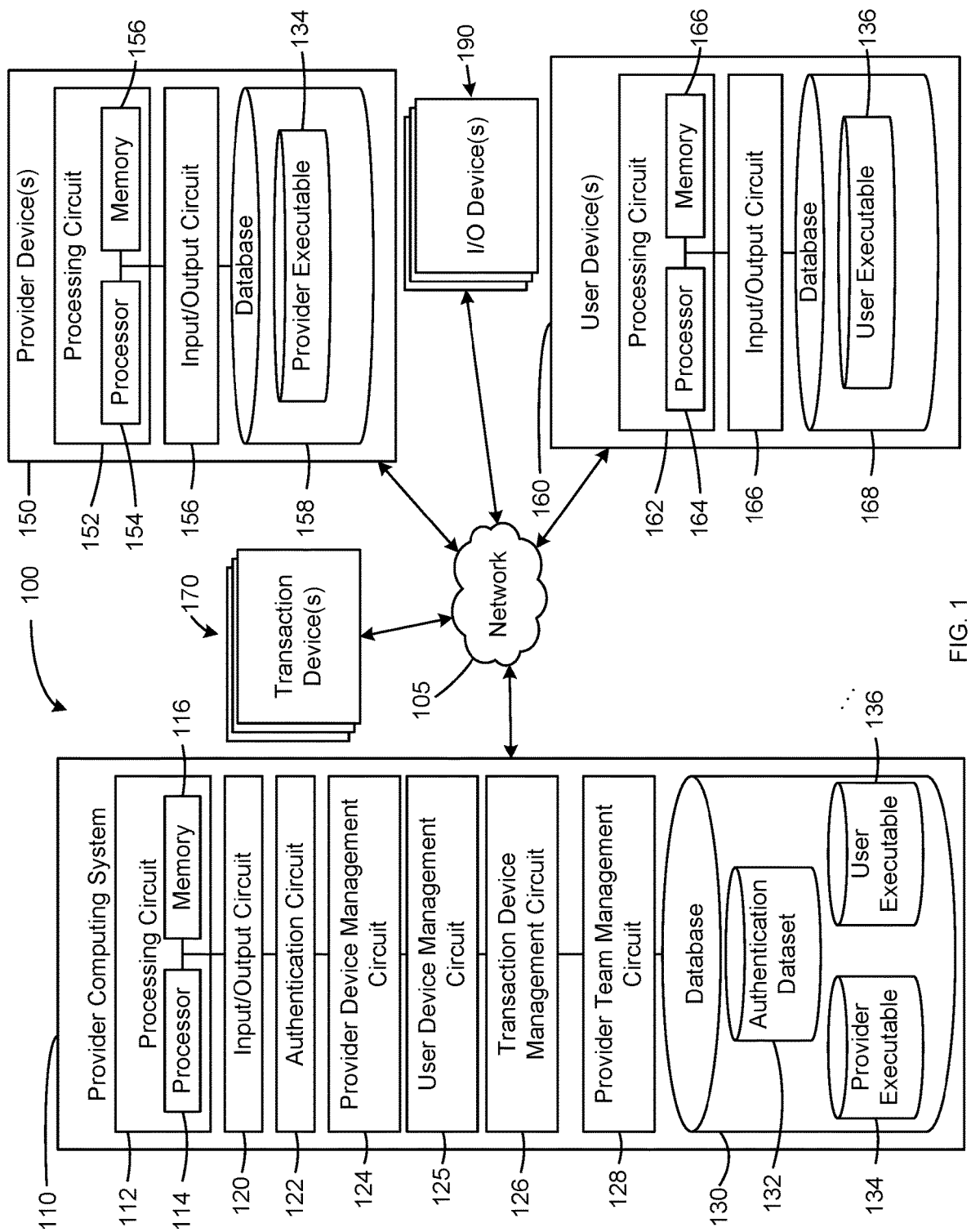
FIG. 1 is a block diagram of a transaction computing system that enables enhanced drive-up banking experience with automatic authentication, according to an example arrangement.

Referring generally to the figures, disclosed are systems, methods and non-transitory computer-readable media for a computing system that enables automatic customer authentication and remotely pre-staged transactions in drive-up banking. In an example illustrative scenario, a user (e.g., customer, authorized user, etc.) initiates a pre-staged transaction request from a user device. In some embodiments, the user device is a wireless user device, such as, a smart phone, a tablet, a laptop, a smart watch, etc. In some embodiments, the user device is a wired user device, such as a desktop computer, a kiosk, etc. . . . The pre-staged transaction request may be initiated using a financial institution application, such as a mobile application, or via a financial institution website. A provider computing system that is associated with a service provider, such as a financial institution (FI), receives the pre-staged transaction request and: (1) selects a FI employee (e.g., teller) and/or service terminal to complete the request, (2) selects a transaction device to complete the request, and (3) automatically prints any transaction documents to facilitate the request. Selecting the FI employee and/or terminal may include analyzing a real-time status of each FI employee and/or terminal, analyzing a capability of reach FI employee and/or terminal, and determining the best FI employee to complete the pre-staged transaction.

As used herein, the terms "terminal", "transaction device", and similar terms refer to software-controlled interactive devices that are used to enable one or more users to execute a transaction. Examples of such devices include teller terminals, cash registers, ATMs, a drive-up station (e.g., a station with a pneumatic tube), and similar devices. In particular, the transaction devices described herein are advantageously controlled by software executed by on or more computing systems described herein, such that the transaction devices provide an enhanced drive-up banking experience with automatic authentication.

In a first example operating scenario, a user may use an application, provided to a user device, to pre-stage a transaction. Pre-staging the transaction (e.g., by the user and application on the mobile device) may include providing transaction details, such as a transaction account (e.g., a checking account, a savings account, a credit card account, etc.), a transaction type (e.g., a deposit, a withdrawal, a payment, etc.), and/or a transaction amount (e.g., a dollar value, a number and/or type of banknotes, etc.). In response to receiving a pre-staged transaction request, the provider computing system may generate authentication information and/or cause a token generator on the user device to generate authentication information, such as a token, a one-time password, etc. When a user arrives in the drive-up location, the provider computing system authenticates the user, for example, by receiving one or more tokens from the user device. Upon successful authentication, the financial institution performs operations including at least one of: (1) evaluating a real-time availability of tellers so as to add the user to a teller-specific dynamic queue, (2) automatically generate (e.g., print) documents for the pre-staged transaction, (3) verify transaction details, and/or (4) execute the pre-staged transaction.

In an example operating scenario, the FI computing system may request one or more authentication tokens from a user before initiating the pre-staged transaction. For example, a user may be prompted, via a user device and/or a transaction device, to input a first authentication token. The first authentication token may include an indication of which transaction device the user is using and/or a first identity token corresponding to the pre-staged transaction request such as a transaction identity (ID), a one-time password (OTP), a wireless connection to a pre-authorized mobile device (e.g., via near-field communications (NFC), Bluetooth, Wi-Fi, and the like), a personal identification number (PIN), and so on. In some embodiments, the user device may have stored in memory thereof a unique device identifier, which may include or consist of a manufacturer identifier, MAC address, IP address, mobile operating system identifier, application identifier (e.g., for the installed instance of the FI application for pre-staging transactions), user identifier, or any combination thereof. When paired to an authentication device at a particular drive-through location (e.g., when wirelessly connecting to an electronic reader, sensor, or other component of the authentication device), the user device may wirelessly transmit the device identifier as part of establishing a connection. The device identifier may comprise or may be included in the authentication token. In some embodiments, the token may be pictorially represented in the form of a scannable code, such as a QR code generated by the application provided to the user device. The second authentication token may include a second identity token that is different from the first identity token.

As will be described in more detail herein below, the first authorization token includes at least one of (1) a first identity token, (2) a an indication that a user has arrived within a second geolocation area associated with a transaction device, and/or (3) any other identifying information encoded in the token. In an some arrangements, the first identity token may include one or more identifiers, such as an obscured or anonymized identifier associated with the user device, application, session information, a user identifier (e.g., a biometric, a ID number, an account number, a PIN, a username, a password, etc.), a one-time password (OTP), an identification card, a picture of the user, a picture of the identification card and/or transaction information (e.g., a transaction ID). The first identity token may be used to verify the identity of the user and/or to verify that the user is associated with the pre-staged transaction. The second authorization token includes a second identity token. The second identity token may include one or more the same identifiers as the first identity token. In some arrangements, the second authentication token may include a different identifier than the first identity token, such that the transaction includes two forms of identification.

In an additional example operating scenario, one or more transaction devices may be designated for completing the pre-staged transactions. In some arrangements, the one or more transaction devices may be exclusive to only users that have initiated a pre-staged transaction. Accordingly, one or more transaction devices may be designated for completing non-pre-staged transaction (e.g., for users that have not initiated a pre-staged transaction). In some arrangements, the FI location does not include separate transaction devices for pre-staged transactions. In any of the above described arrangements, the user interface of FIGS. 6A and 6B may display a notification to a user that has initiated a pre-staged transaction indicating a wait time for a pre-staged transaction compared to a non-pre-staged transaction.

The systems, methods and non-transitory computer-readable media described herein provide a technical solution to the technical problem of enabling a plurality of pre-staged transactions with automatic authentication. For example, the systems, methods and non-transitory computer-readable media described herein further provide an improved user interface for a provider employee. The improved user interface advantageously automatically arranges interactive icons displaying pre-staged transaction requests. In conventional systems, transaction requests may be ordered based on a first-come-first-serve (e.g., a queue of customers at a FI branch location, a queue of customers at a drive-up FI location, and so on), or based on a wait time (e.g., a queue based on when a customer first arrived at a FI location). The improved user interface described herein advantageously considerers multiple parameters for queuing the pre-staged transaction requests, for example, based on wait time, transaction type, and/or transaction device location.

In additional arrangements, the systems, methods and non-transitory computer-readable media described herein provide an improved transaction processing system that reduces the time to complete transactions via load balancing, queuing, and/or automatic authentication. For example, in some arrangements the FI computing system may automatically print transaction documents related to the pre-staged transaction request before and/or as the user associated with the pre-stage transaction request arrives at a FI location. In some arrangements, the FI computing system may prioritize certain pre-staged transaction requests by assigning the pre-staged transaction requests to particular tellers and/or particular transaction devices. Conventional systems may allow FI customers to interact with any teller and/or transaction device. However, when a transaction requires a different teller (e.g., a teller with higher administrative privileges) and/or a different transaction device, the transaction must be re-assigned. Accordingly, transaction requiring a particular teller and/or transaction device will be assigned to the correct teller and/or transaction device thereby preventing teller and/or transaction device re-assignment during a transaction.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a block diagram of a transaction computing system, according to an example arrangement. In some arrangements, the system 100 is associated with a service provider such as a business, a financial institution, and the like, which provides transaction devices for customers to perform transactions (e.g., deposits, withdrawals, purchases, or other transactions). In some arrangements, and as shown in FIG. 1, the system 100 includes a provider computing system 110, one or more provider devices 150, one or more user devices 160, one or more transaction devices 170, and one or more I/O devices 190. In some arrangements, the system 100 includes more or fewer components than as shown in FIG. 1. For example, the system 100 one or more of the transaction device(s) 170, and the I/O device(s) 190 may be optional components of the system 100.

Each of the components of the system 100 are in communication with each other and are connected by a network 105. Specifically, the provider computing system 110, the one or more provider devices 150, the one or more user devices 160, the one or more transaction devices 170, and the one or more I/O devices 190 are communicatively coupled to the network 105 such that the network 105 permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the provider computing system 110 and other computing systems associated with the service provider or with a customer of the service provider such as a user device (e.g., a mobile device, smartphone, desktop computer, laptop computer, tablet, or any other computing system). The network 105 may include one or more of a cellular network, the Internet, Wi-Fi, Wi-Max, a proprietary provider network, a proprietary retail or service provider network, and/or any other kind of wireless or wired network.

In some arrangements, the provider computing system 110 may be a local computing system at a business location (e.g., a branch of a financial institution, a retail store location, or any other physical location). In some arrangements, the provider computing system 110 may be a remote computing system such as a remote server, a cloud computing system, and the like. In some arrangements, the provider computing system may be part of a larger computing system such as a multi-purpose server or other multi-purpose computing system. In some arrangements, the provider computing system 110 may be implemented on a third-party computing device operated by a third-party service provider (e.g., AWS, Azure, GCP, and/or other third party computing services).

As shown in FIG. 1, the provider computing system 110 includes a processing circuit 112, input/output (I/O) circuit 120, one or more specialized processing circuits shown as an authentication circuit 122, a provider device management circuit 124, a user device management circuit 125, a transaction device management circuit 126, and a provider team management circuit 128, and a database 130. The processing circuit 112 may be coupled to the input/output circuit 120, the specialized processing circuits, and/or the database 130. The processing circuit 112 may include a processor 114 and a memory 116. The memory 116 may be one or more devices (e.g., RAM, ROM, Flash memory, hard disk storage) for storing data and/or computer code for completing and/or enabling the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the computing system 110 is configured to run a variety of application programs and store associated data in a database of the memory 116 (e.g., database 130).

The input/output circuit 120 is structured to receive communications from and provide communications to other computing devices, users, and the like associated with the provider computing system 110. The input/output circuit 120 is structured to exchange data, communications, instructions, and the like with an input/output device of the components of the system 100. In some arrangements, the input/output circuit 120 includes communication circuitry for enabling the exchange of data, values, messages, and the like between the input/output device 120 and the components of the provider computing system 110. In some arrangements, the input/output device 120 includes machine-readable media for enabling the exchange of information between the input/output circuit 120 and the components of the provider computing system 110. In some arrangements, the input/output circuit 120 includes any combination of hardware components, communication circuitry, and machine-readable media.

In some arrangements, the I/O circuit 120 may include a network interface. The network interface may be used to establish connections with other computing devices by way of the network 105. The network interface may include program logic that facilitates connection of the provider computing system 110 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). For example, the I/O circuit 120 may include an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

In some arrangements, the I/O circuit 120 includes suitable input/output ports and/or uses an interconnect bus (e.g., bus 502 in FIG. 7) for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 120 may provide an interface for the user to interact with various applications and/or executables stored on the provider computing system 110. For example, the input/output circuit 120 may include a keyboard, a keypad, a mouse, joystick, a touch screen, a microphone, a biometric device, a virtual reality headset, smart glasses, and the like. As another example, input/output circuit 120, may include, but is not limited to, a television monitor, a computer monitor, a printer, a facsimile, a speaker, and so on.

In some arrangements, the I/O circuit 120 may communicatively couple to the one or more I/O devices 190 (e.g., via the network 105). Accordingly, the I/O circuit 120 may be structured to receive sensor data from the one or more I/O devices 190. The I/O circuit 120 may also be structured to send and/or receive data to/from the I/O devices 190. For example, a first I/O devices of the one or more I/O devices 190 may include a display, and the I/O circuit 120 may provide image data (e.g., a user interface, a scannable code, an operational status, etc.) to the first I/O device such that the image data is displayed by the first I/O device.

The memory 116 may store a database 130, according to some arrangements. The database may retrievably store data associated with the provider computing system 110 and/or any other component of the system 100. That is, the data may include information associated with each of the components of the system 100. For example, the data may include information about the provider device(s) 150, the user device(s) 160, the transaction device(s) 170, and/or the I/O device(s) 190. The data may be retrievable, viewable, and/or editable by the provider computing system 110 (e.g., by user input via the I/O circuit 120). The database 130 may be configured to store one or more applications and/or executables to enable operations such as transactions and/or any other operation described herein. In some arrangements, the applications and/or executables may be incorporated with an existing application in use by the provider computing system 110. In some arrangements, the applications and/or executables are separate software applications implemented on the provider computing system 110. The applications and/or executables may be downloaded by the provider computing system 110 prior to its usage, hard coded into the memory 116 of the processing circuit 112, or be a network-based or web-based interface application such that the provider computing system 110 may provide a web browser to access the application, which may be executed remotely from the provider computing system 110 (e.g., by a user device). Accordingly, the provider computing system 110 may include software and/or hardware capable of implementing a network-based or web-based application. For example, in some instances, the applications and/or executables include software such as HTML, XML, WML, SGML, PHP (Hypertext Preprocessor), CGI, and like languages.

In the latter instance, a user (e.g., a provider employee) may log onto or access the web-based interface before usage of the applications and/or executables. In this regard, the applications and/or executables may be supported by a separate computing system including one or more servers, processors, network interface, and so on, that transmit applications for use to the provider computing system 110.

In the arrangement shown in FIG. 1, the database 130 stores an authentication dataset 132, a provider executable 134, and a user executable 136. The authentication dataset 132 may include user account data associated with a user account such as an account number, an account balance, an account type, authentication data, and/or other data associated with a user account at the FI. The authentication data may include one or more of a password, a PIN, a voice ID, a biometric ID, a FI issued account number, a government issued ID, a token, a device identifier and so on. In some arrangements, the authentication dataset 132 may also store instructions for generating an OTP such that the provider computing system 110 and/or components thereof may generate an OTP. In some arrangements, the authentication dataset 132 may also store instructions for generating a user device identifier, an application instance identifier for an application represented by and/or associated with the user executable 136 on the user device, etc. In some arrangements, the authentication dataset 132 may also store instructions and/or store identifiers for establishing application sessions by the user executable 136. For instance, a session may be automatically created when a user runs the user executable 136 to access the application on the user device and/or when it is determined (using, e.g., a sensor of the I/O device 190) that the user device is in a predetermined geographical location, within a predetermined threshold of the authentication device in the drive-up location, etc.

Accordingly, a session may be initiated without user interaction and may be utilized by the authentication device (e.g., via querying the authentication dataset 136) to verify that the user device is indeed at the appropriate physical location, drive-up lane, etc. and to prevent the spoofing of the user device identifier. At least one of the authentication data and the OTP may be used to authenticate a user associated with a pre-staged transaction request.

The provider executable 134 includes one or more executables for providing a provider application on the provider device(s) 150. In some embodiments, the provider executable 134 includes an application such as a mobile application, a computer application, and the like. In some arrangements, the provider executable 134 includes a web-based application such that the provider device(s) 150 may access the application via the network 105. The provider executable 134 include instructions to enable operations such as pre-staged transactions described herein. For example, the provider executable 134 may include instructions for generating an improved provider interface (described herein, below, with respect to FIGS. 5A and 5B). In some embodiments, the provider executable 134 includes instructions for any other operation associated with the provider device(s) 150 described herein.

The user executable 136 includes one or more executables for providing a provider application on the user device(s) 160. In some embodiments, the user executable 136 includes an application such as a mobile application, a computer application, and the like. In some arrangements, the user executable 136 includes a web-based application such that the user device(s) 160 may access the application via the network 105. The user executable 136 include instructions to enable operations such as pre-staged transactions described herein. For example, the user executable 136 may include instructions for generating an improved user interface (described herein, below, with respect to FIGS. 6A and 6B). In some embodiments, the user executable 136 includes instructions for any other operation associated with the user device(s) 160 described herein. In various embodiments, the user executable 136 may include a token generator, a device identifier generator, an application instance identifier generator, a session generator, etc. In some embodiments, the generators are embodied in computer-executable code, which may be stored locally in memory of the transaction device or accessed at a remote computing system, such as the authentication dataset 132 at the provider computing system 110.

In some arrangements, the provider computing system 110 includes hardware, software, or any combination of hardware and software structured to enable operations of the components of the system 100. For example, and as shown in FIG. 1, the provider computing system includes specialized processing circuits shown as an authentication circuit 122, a provider device management circuit 124, a user device management circuit 125, a transaction device management circuit 126, and a provider team management circuit 128. The specialized circuits include any combination of hardware and software for enabling a pre-staged transaction. In some embodiments, the provider computing system 110 may include any combination of hardware and software including specialized processing circuits, applications, executables, and the like for controlling, managing, or enabling the operation of the other computing systems of the system 100 including the provider device(s) 150, the user device(s) 160, the transaction device(s) 170, and/or the I/O device(s) 190. For example, the provider computing system 110 may include additional processing circuits and associated software for controlling the operation of components of the system 100. The additional specialized circuits may be substantially similar to the specialized processing circuits described herein below.

In some arrangements, the authentication circuit 122 is structured to enable automatically authenticating a user for a pre-staged transaction. In some arrangements, the authentication circuit 122 is structured to receive (e.g., via the I/O circuit 120) from one or more components of the system 100 an authentication token. The authentication token may include one or more of a transaction token and an identity token. The transaction token may include information associated with a pre-staged transaction request such as a pre-staged transaction request number, an indication of a transaction device associated with the pre-staged transaction, and/or any other parameter associated with a pre-staged transaction request. The identity token may include a transaction identity (ID), a one-time password (OTP), a wireless connection to a pre-authorized mobile device (e.g., near field connection (NFC), Bluetooth, Wi-Fi, and the like), a personal identification number (PIN), a FI issued account number, a government issued ID, a device identifier, and/or any other identification or security value associated with a user.

Authenticating, by the authentication circuit 122, includes receiving the authentication token and comparing the authentication token to the authentication dataset 132 and determining whether the authentication token is included in the authentication dataset 132. For example, the authentication circuit 122 may receive a first authentication token having a first identity token. The authentication circuit 122 may compare the first identity token to identity tokens stored in the authentication dataset 132. If the authentication circuit 122 finds a match, the authentication circuit 122 may provide an indication to one or more components of the provider computing system 110 and/or the system 100 that the first authentication token is verified. In some arrangements, the authentication token is received, by the authentication circuit 122, from a device on the network 105 (e.g., via the I/O circuit 120). For example, the authentication token may be received from at least one of the user device(s) 160, the transaction device(s) 170, and/or the I/O device(s) 190. Accordingly at least one of the user device(s) 160, the transaction device(s) 170, and/or the I/O device(s) 190 may be configured to receive the authentication token from a user.

Please also make sure to describe a scenario where a customer pre-stages a transaction and their app generates the token comprising the device identifier and transaction identifier. The token can be transmitted to the provider system to be stored in a database and may be a time limited token. The authentication device will query the database to authenticate the customer-provided token against the stored token.

In some arrangements, the provider device management circuit 124 is structured to enable the operations of the provider device(s) 150. For example, the provider device management circuit 124 may generate a provider interface (described herein, below). The provider device management circuit 124 may receive provider employee data from the provider device(s) 150. The provider employee data may include a real-time (e.g., updated every second, every minute, etc.), status of each provider employee. Each real-time status includes an indication of a present task of a corresponding provider employee is doing in real-time. For example, a provider employee may be assisting a customer with a transaction, on break, idle, and so on. The real-time status may further indicate whether the present task is in progress, recently started, nearing completion, and so on. For example, the real-time status may indicate that a provider employee has recently started a break, the provider employee data may also include employee statistics for each provider employee. The statistics for each provider employee may include: years of experience, average mistakes made per transaction, seniority level, employment history, and/or other parameters associated with each provider employee.

In some arrangements, the user device management circuit 125 is structured to enable sending and receiving data to/from the user device(s) 160. For example, the user device management circuit 125 may generate a user interface (described herein, below). The user device management circuit 125 may also be structured to receive the pre-staged transaction request from the user device(s) 160. The pre-staged transaction request may include pre-staged transaction data, such as account information, transaction amounts, transaction types, and so on. The pre-staged transaction request may be received by the user device management circuit 125 (e.g., via the I/O circuit 120 and the network 105).

In some arrangements, the transaction device management circuit 126 is structured to enable the operation of the transaction device(s) 170. Accordingly, the transaction device management circuit 126 may include hardware and/or software for enabling the operation of the transaction device(s) 170. In some arrangements, the transaction device management circuit 126 is structured to operate one or more components of the transaction device(s) such as transport apparatus 176 (described herein, below, with respect to FIG. 2).

In some arrangements, the provider team management circuit 128 may be structured to select a provider employee of a plurality of provider employees for completing the pre-staged transaction, responsive to receiving the pre-staged transaction request. In these arrangements, the provider team management circuit 128 may receive provider employee data from the provider device managed circuit 124. The provider team management circuit 128 is structured to select a provider employee for completing a pre-staged transaction based on the provider employee data. For example, provider team management circuit 128 may assign one or more thresholds to one or more parameters of a pre-staged transaction request including a minimum experience level provider employee, a minimum wait time, a maximum wait time, a maximum mistake risk threshold, a minimum seniority level, and/or thresholds for other parameters related to the provider employee and/or the pre-staged transaction.

In some arrangements, the provider device(s) 150 is a computing system for use by a provider employee. In some arrangements, the provider device(s) 150 may include a mobile device (e.g., smartphone, tablet, and so on), a laptop computer, a desktop computer, and the like. In some arrangements, the system 100 includes more than one provider device(s) 150.

As shown in FIG. 1, the provider device(s) 150 includes a processing circuit 152, an I/O circuit 157, and a database 158. In some arrangements, the processing circuit 152, the I/O circuit 157, and the database 158 are the same or substantially similar to the processing circuit 112, the I/O circuit 120, and the database 130 of the provider computing system 110. For example, the processing circuit 152 may include a processor, shown as processor 154, and memory, shown as memory 156, that is the same as or substantially similar to the processor 114 and memory 116.

In some arrangements, the database 158 stores the provider executable 134 such that the provider device(s) 150 is operable to execute the provider executable 134. For example, the provider device(s) 150 may execute the provider executable 134 to generate and/or display the provider interface (described herein, below).

As shown in FIG. 1, the user device(s) 160 includes a processing circuit 162, an I/O circuit 167, and a database 168. In some arrangements, the processing circuit 162, the I/O circuit 167, and the database 168 are the same or substantially similar to the processing circuit 112, the I/O circuit 120, and the database 130 of the provider computing system 110. For example, the processing circuit 162 may include a processor, shown as processor 164, and memory, shown as memory 166, that is the same as or substantially similar to the processor 114 and memory 116.

In some arrangements, the database 168 stores the user executable 136 such that the user device(s) 160 is operable to execute the provider executable 134. For example, the user device(s) 160 may execute the user executable 136 to generate and/or display the user interface (described herein, below).

The transaction device(s) 170 is a device located at a physical location associated with the service provider (e.g., a FI branch). The transaction device(s) 170 is structured to enable a transaction. The transaction may be a pre-staged transaction or a non-pre-staged transaction. The transaction device(s) 170 may include one or more devices for passing transaction media between a provider employee and a user (e.g., customer), such as a vacuum air tube, a drawer, a series of belts or rollers, and so on. In some arrangements, the transaction device(s) 170 may have on-board computing systems for controlling the operation of the transaction device(s) 170. In some arrangements, the transaction device(s) 170 may have control circuitry and a communication interface such that the operations of the transaction device(s) 170 are controlled by the transaction device management circuit 126.

The one or more I/O devices 190 include one or more devices located at a physical location associated with the service provider (e.g., a FI branch). In some arrangements, the one or more I/O devices 190 may include any input device structured to receive one or more inputs associated with a pre-staged transaction described herein. For example, the one or more I/O devices 190 may include a biometric scanner, a camera, and so on. In some arrangements, the one or more I/O devices 190 may include any output device structured to output one or more outputs associated with a pre-staged transaction described herein. For example, the one or more I/O devices 190 may include a speaker, a display, and so on. In some arrangements, the one or more I/O devices 190 are structure to facilitate establishing communication via the network 105. For example, the one or more I/O devices 190 may be structured to establish a near field connection (NFC), Bluetooth connection, Wi-Fi connection, and so on, between a computing device (e.g., the provider device 150, the user device 160, and so on) and the network 105. In some arrangements, the one or more I/O devices 190 may have on-board computing systems for controlling the operation of the one or more I/O devices 190. In some arrangements, the one or more I/O devices 190 may have control circuitry and a communication interface such that the operations of the one or more I/O devices 190 are controlled by the input/output circuit 120. In some arrangements, one or more of the I/O devices 190 is provided on or proximally to one or more of the transaction devices 170.

In some arrangements, the I/O devices 190 may include one or more sensors. The one or more sensors include one or more sensing devices located at a physical location associated with the service provider (e.g., a FI branch). The one or more sensors may include any physical sensor structured to detect one or more parameters associated with a pre-staged transaction described herein. For example, the one or more sensors may be structured to detect a location of a user device 160, a biometric input, a video input, an audio input, and so on. In an example arrangement, the one or more sensors may include a positioning sensor, such as a GPS, structured to determine a location of a user device 160 and/or a provider device 150. In some arrangements, the one or more sensors may have on-board computing systems for controlling the operation of the one or more sensors. In some arrangements, the one or more sensors may have control circuitry and a communication interface such that the operations of the one or more sensors are controlled by the input/output circuit 120.

Figure 2:
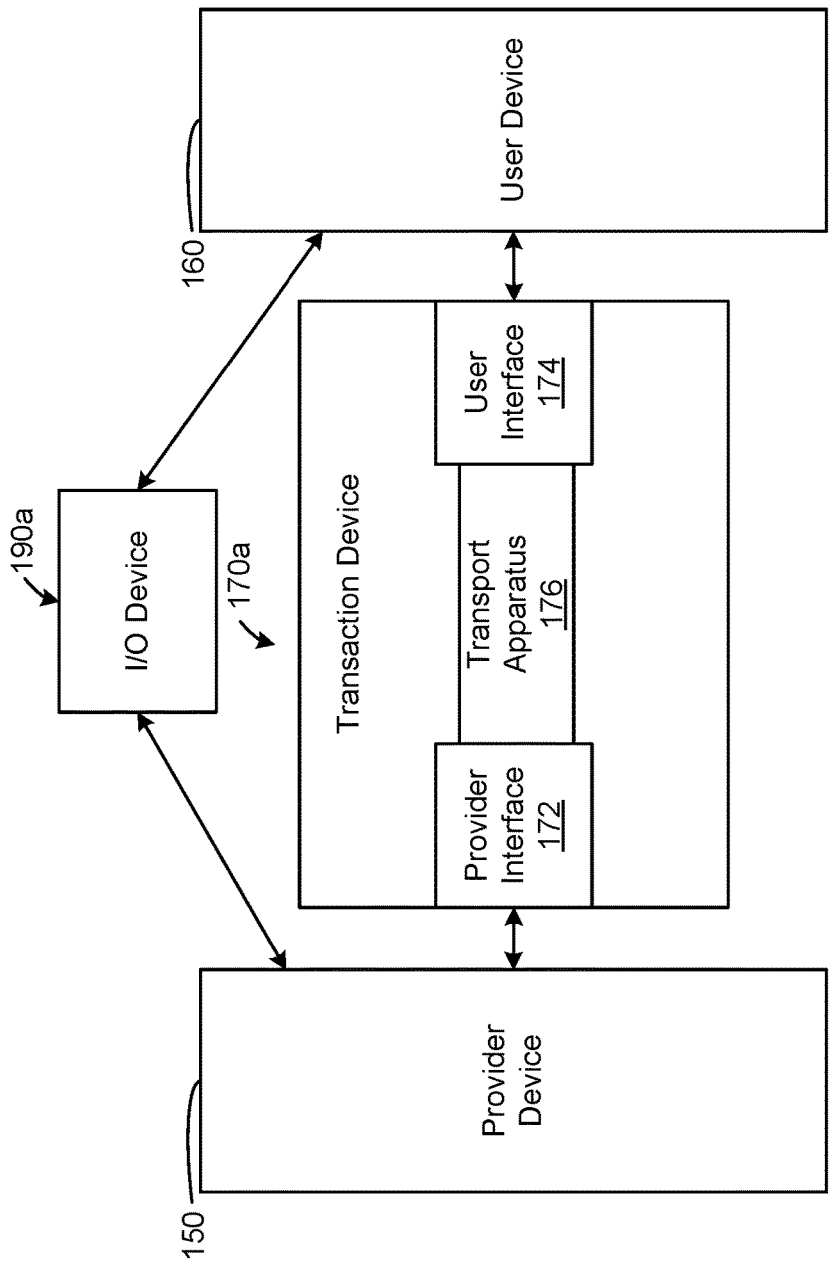
FIG. 2 is a block diagram showing aspects of the transaction computing system of FIG. 1, according to an example arrangement.

In some arrangements, at least one of the transaction device(s) 170 and/or the I/O device(s) 190 is structured as an authentication device. In some arrangements and as shown in FIG. 2, at least one of the transaction device(s) 170 and/or the I/O device(s) 190 is provided at a particular drive-through location. Accordingly, at least one of the transaction device(s) 170 and/or the I/O device(s) 190 are structured to receive a token (e.g., an authentication token). In a first example arrangement, the transaction device(s) 170 may be structured to receive a user input (e.g., a touch input at a user interface 174, shown in FIG. 2) that includes the authentication token. In another example arrangement, the I/O device(s) 190 is structured as an electronic reader, sensor, or other wireless connection device, such that the I/O device(s) 190 wirelessly connects to the user device, and the user device may wirelessly transmit the authentication to the I/O device(s) 190. In yet another example arraignment, one or more sensors of the I/O device(s) 190 are structured to sense, detect, or otherwise acquire a user input (e.g., a touch input, a voice input, a video input, a biometric input, etc.) that includes the authentication token.

FIG. 2 is a block diagram showing aspects of the system 100 of FIG. 1, according to an example arrangement. As shown the provider device 150, the user device 160, a first transaction device 170a, a first sensor 180a, and a first I/O device 190a are communicatively coupled to each other (e.g., via the network 105). In some arrangements, the provider device 150, the user device 160, a first transaction device 170a, a first sensor 180a, and a first I/O device 190 are also communicatively coupled to the provider computing system 110.

As shown, the first transaction device 170a includes a provider interface 172, a user interface 174, and a transport apparatus 176. The provider interface 172 may include interface elements for performing a transaction at the first transaction device 170a. For example, the provider interface 172 may include a media pocket for receiving physical transaction media and providing the physical transaction media to the transport apparatus 176. In some arrangements, one or more of the first I/O device 190a and the first sensor 180a are provided on or proximally to the provider interface 172 such that the first I/O device 190a and/or the first sensor 180a form at least part of the provider interface 172. For example, the provider interface 172 may include first I/O device 190a implemented as a display.

The user interface 174 may include interface elements for performing a transaction at the first transaction device 170a. For example, the user interface 174 may include a media pocket for receiving physical transaction media and providing the physical transaction media to the transport apparatus 176. In some arrangements, one or more of the first I/O device 190a and the first sensor 180a are provided on or proximally to the user interface 174 such that the first I/O device 190a and/or the first sensor 180a form at least part of the user interface 174. For example, the user interface 174 may include first I/O device 190a implemented as a display.

The transport apparatus 176 physically connects the provider interface 172 and the user interface 174 such that transport apparatus 176 is structured to transport physical transaction media between the provider interface 172 and the user interface 174. In some arrangements, the transport apparatus 176 is one of a vacuum air tube, a drawer, and/or other suitable physical transport apparatus.

In some arrangements, the I/O device 190a may enable communication between a user (e.g., customer) and a provider employee. For example the first I/O device 190 may include a two-way communication system having a speaker, a microphone, a video capture device, and/or a display. In some arrangements, the I/O device 190a may enable communication between the provider device 150 and the user device 160. For example the first I/O device 190 may include a wireless or wired transceiver capable of establishing communication between the provider device 150 and the user device 160 using a wired or wireless connection, such as Ethernet, Wi-Fi, Bluetooth, NFC, etc. For example, the first I/O device 190a may include an NFC device, such as an NFC puck) positioned proximally to the user interface 174. A user device 160 may scan the first I/O device 190a and the first I/O device 190a may provide an indication to the user device 160 (and/or to the provider device 150 and/or the provider computing system 110 via the user device 160) that the user device 160 is at the first transaction device 170a.

In some arrangements, the I/O device 190a may enable receiving communication from a user (e.g., customer) and/or a user device 160. For example the I/O device 190a may include a user input device such as a microphone, a video capture device, a touch input device (e.g., keyboard, keypad, touchscreen display, and so on), and/or other suitable user input device. In some arrangements, the I/O device 190a may include a communication between the provider device 150 and the user device 160. For example the I/O device 190a may include a wireless or wired transceiver capable of establishing communication between the provider device 150 and the user device 160 using a wired or wireless connection, such as Ethernet, Wi-Fi, Bluetooth, NFC, etc.

Figure 3:
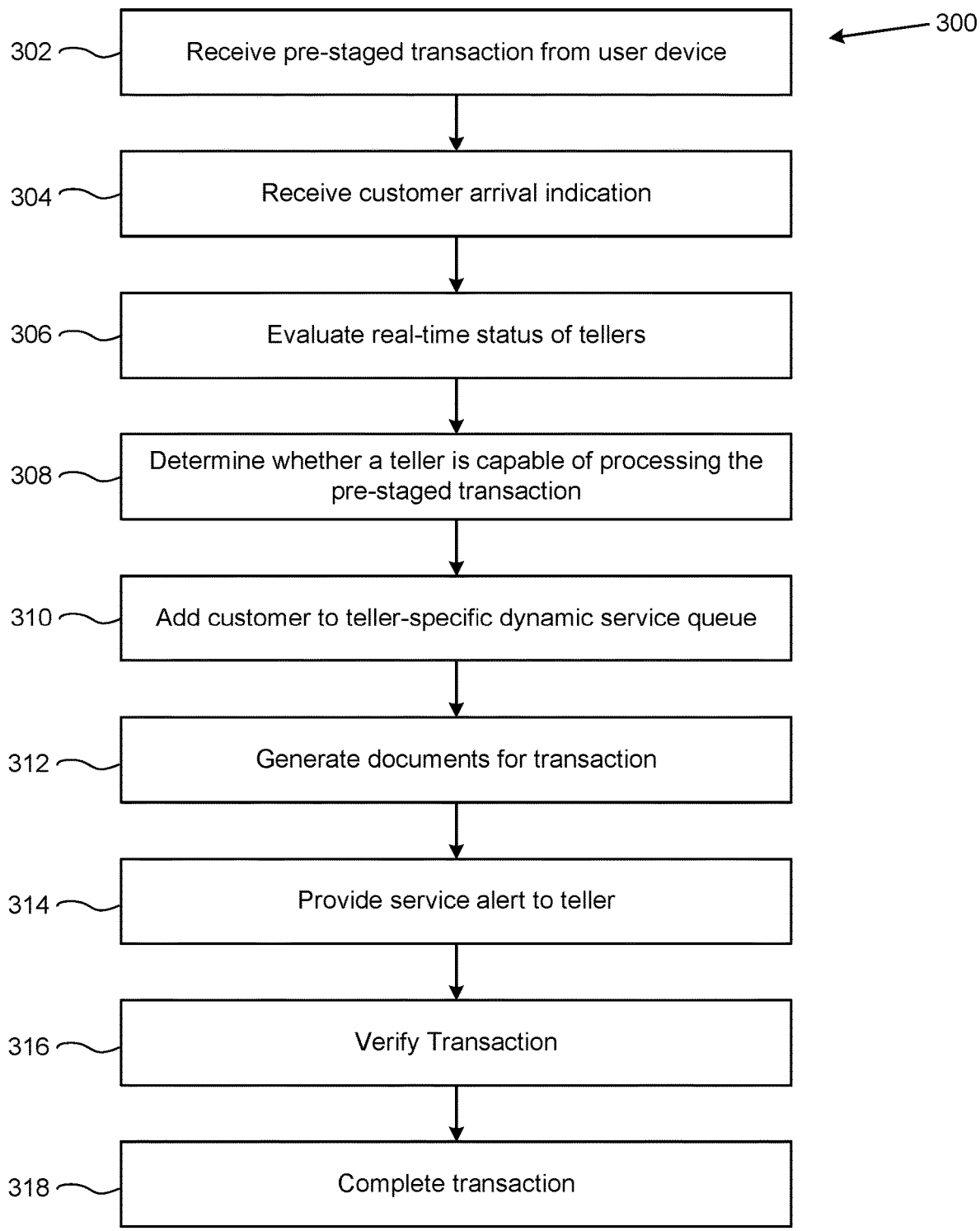
FIG. 3 is a flow diagram of a method of enabling a pre-staged transaction with the transaction computing system of FIG. 1, according to an example arrangement.

FIG. 3 is a flow diagram of a method 300 of enabling a pre-staged transaction with the transaction computing system 100 of FIG. 1, according to an example arrangement. In some arrangements, one or more of the computing systems of the system 100 may be configured to perform method 300. For example, the provider computing system 110, the provider device 150, and/or the user device 160 may be structured to perform the method 300. In some arrangements, one or more of the transaction device(s) 170, the sensor(s) 180, and/or the I/O device(s) 190 may be configured to perform the method 300. In an example arrangement, the provider computing system 110, the provider device 150, and/or the user device 160 may, alone or in combination with other devices, such as the a transaction device(s) 170, the sensor(s) 180, and/or the I/O device(s) 190 may perform the method 300. In some arrangements, the method 300 may include user inputs from a user (e.g., a provider employee) one or more user devices (such as devices of provider employees), another computing device on the network 105, and the like.

In broad overview of method 300, at step 302, the provider computing system 110 receives a pre-staged transaction from the user device 160. At step 304, the provider computing system 110 receives a customer arrival notification. At step 306, the provider computing system 110 evaluates a real-time status of tellers. At step 308, the provider computing system 110 determines whether a teller is capable of processing the pre-staged transaction. At step 310, the provider computing system 110 adds the customer to a teller-specific dynamic service queue. At step 312, the provider computing system 110 generates documents for the transaction. At step 314, the provider computing system 110 provides a service alert to the teller. At step 316, the provider computing system 110 verifies the transaction. At step 318, the provider computing system 110 completes the transaction. In some arrangements, the steps of the method 300 may be performed in a different order than as shown in FIG. 3. For example, step 308 may be performed before step 306. In some arrangements, the method 300 may include more or fewer steps than as shown in FIG. 3.

Referring to the method 300 in more detail, at step 302, the provider computing system 110 receives a pre-staged transaction request from the user device 160. As briefly described above, the pre-staged transaction request includes one or more transaction parameters, such as an account number, a transaction type, a transaction amount, and so on. In some arrangements, the provider computing system 110 receives the pre-staged transaction request from the user device 160 via the network 105.

At step 304, the provider computing system 110 receives a customer arrival notification. The customer arrival notification may be received from the one or more sensors 180 and/or the one or more I/O devices 190. For example, the one or more sensors 180 may detect that a user device 160 has entered a first geolocation area, where the geolocation area is associated with a physical location of the FI.

At step 306, the provider computing system 110 evaluates a real-time status of tellers. As described above, the provider team management circuit 128 may receive real-time status data from the provider device(s) 150. The provider team management circuit 128 may determine, based on the real-time status data, a real time status for each of a plurality of provider employees.

At step 308, the provider computing system 110 determines whether a teller is capable of processing the pre-staged transaction. In some arrangements, the provider team management circuit 128 may receive provider team member data including provider team member statistics. The provider team management circuit 128 may determine based on the provider team member statistics and/or the real time status of each provider employee, whether a provider employee is capable of processing the pre-staged transaction. For example, the provider team management circuit 128 may determine that a first provider employee is capable of processing the pre-staged transaction if the first provider employee's real-time status indicates that the first provider employee is currently idle or will finish a different work event (e.g., assisting another customer, on break, starting a shift, and so on) within a predetermined time period. The time period may be based on one or more of the transaction type, an amount of time the customer has already been waiting, and/or other parameters associated with the pre-staged transaction. In some arrangements, the provider team management circuit 128 may further determine that a first provider employee is capable of processing the pre-staged transaction if the first provider employee's statistics (e.g., experience level, tendency to make mistakes, seniority level, and so on) are within a threshold amount associated with the pre-staged transaction.

At step 310, the provider computing system 110 adds the customer to a teller-specific dynamic service queue. The teller-specific dynamic service queue may be displayed on the provider device 150 (as described herein, below, with respect to FIG. 5). In some arrangements, the provider team management circuit 128 and/or the provider device management circuit 124 may update the teller-specific dynamic service queue with additional pre-staged transaction requests. Accordingly the teller-specific dynamic service queue may be advantageously automatically updated with new pre-staged transaction requests as the provider computing system assigns customers to the teller-specific dynamic service queue. The pre-staged transaction requests may be positioned in the queue in an order based on a transaction type, an amount of time a customer has been waiting, and/or other parameters associated with the pre-staged transaction requests. For example, a first type of transaction may have a higher priority than a second type of transaction. Accordingly, a first pre-staged transaction request for a first transaction type may be positioned in a teller-specific dynamic service queue before a second pre-staged transaction request for a second transaction type. Additionally, a first pre-staged transaction request having a first user arriving before a second user associated with a second pre-staged transaction request may be positioned before the second pre-staged transaction request in the teller-specific dynamic service queue. In an example arrangement, the provider computing system 110 is structured to consider multiple variables when ordering the pre-staged transaction requests in the teller-specific dynamic service queue, such as teller experience, teller seniority level, number of pre-staged transactions already in a teller queue, teller break or shift start and end time (e.g., by comparing the expected transaction completion time to the amount of time remaining until a teller's scheduled break or end time), availability of media in a particular teller terminal (e.g., cash, transaction receipts, etc.).

At step 312, the provider computing system 110 generates documents for the transaction. For example, if the pre-staged transaction request for a pre-staged transaction requires a specific document, the provider computing system 110 may automatically generate (e.g., print, via the I/O circuit 120) the specific document for the pre-staged transaction. In some arrangements, the pre-staged transaction does not require a document and the provider computing system 110 skips step 312.

At step 314, the provider computing system 110 provides a service alert to the teller. The provider computing system 110 may, at least partially, generate a notification for displaying on the provider device 150. In some arrangements, the provider device 150, at least partially, generates the notification. The notification indicates that the user has arrived at a designated transaction device.

At step 316, the provider computing system 110 verifies the transaction. For example, the authentication circuit 122 may authentic a user, as described, above, with respect to FIG. 1. At step 318, the provider computing system 110 completes the transaction. For example, the transaction device management circuit 126 may cause the transport apparatus 176 to pass physical transaction media between the provider interface 172 and the user interface 174.

Figure 4:
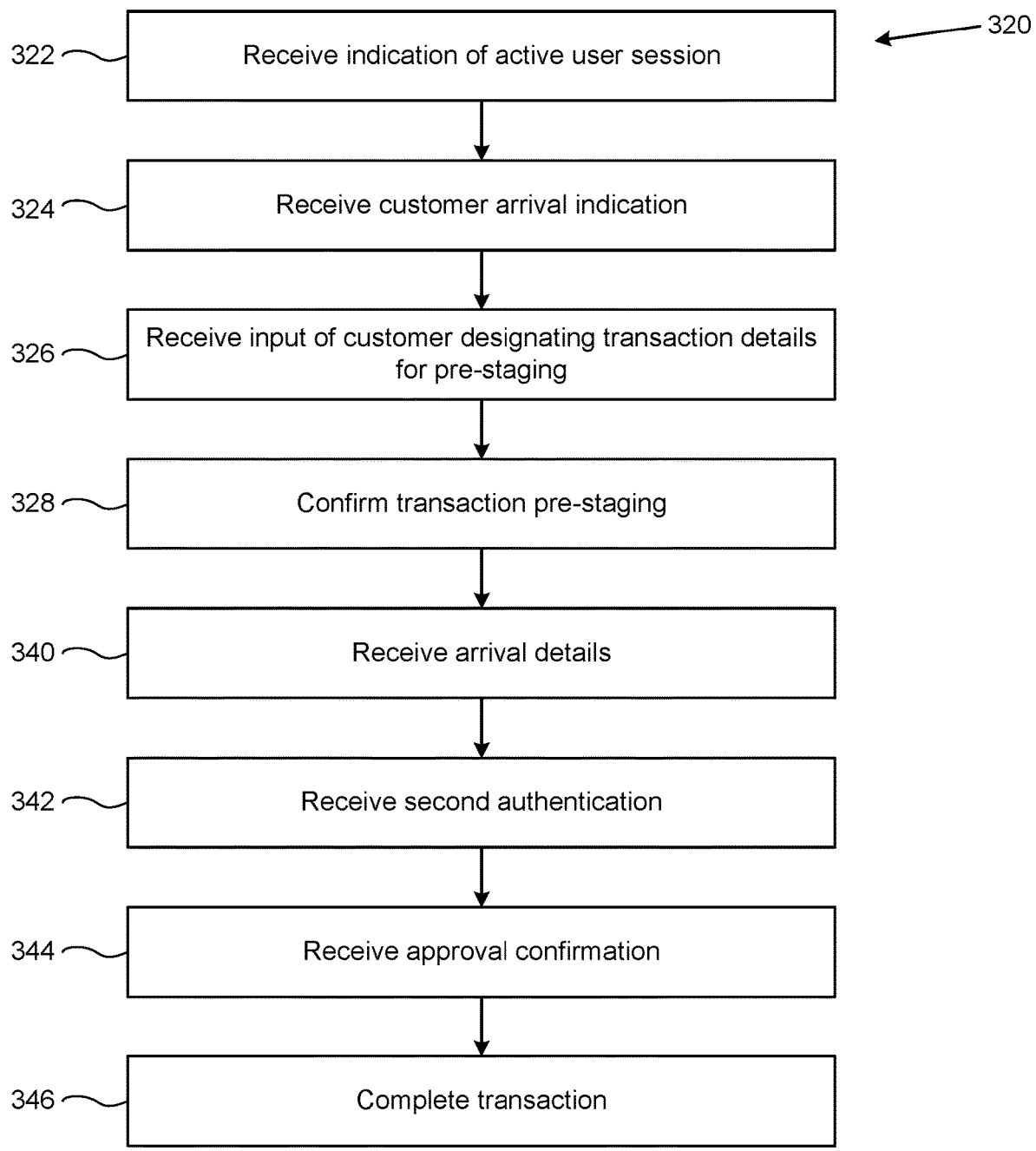
FIG. 4 is a flow diagram of a method of enabling a pre-staged transaction with the transaction computing system of FIG. 1, according to an example arrangement.

FIG. 4 is a flow diagram of a method 320 of enabling a pre-staged transaction with the transaction computing system 100 of FIG. 1, according to an example arrangement. In some arrangements, one or more of the computing systems of the system 100 may be configured to perform method 320. For example, the provider computing system 110, the provider device 150, and/or the user device 160 may be structured to perform the method 320. In some arrangements, one or more of the transaction device(s) 170, the sensor(s) 180, and/or the I/O device(s) 190 may be configured to perform the method 320. In an example arrangement, the provider computing system 110, the provider device 150, and/or the user device 160 may, alone or in combination with other devices, such as the a transaction device(s) 170, the sensor(s) 180, and/or the I/O device(s) 190 may perform the method 320. In some arrangements, the method 320 may include user inputs from a user (e.g., a provider employee) one or more user devices (such as devices of provider employees), another computing device on the network 105, and the like. In some arrangements, the method 320 is performed concurrently, partially concurrently, or sequentially with the method 300.

In broad overview of method 320, at step 322, the provider computing system 110 receives an indication of an active user session. At step 324, the provider computing system 110 receives a customer arrival indication. At step 236, the provider computing system 110 receives an input of a customer designating transaction details for pre-staging a transaction. At step 328, the provider computing system 110 confirms the pre-staged transaction. At step 330, the provider computing system 110 receives arrival details. At step 332, the provider computing system 110 receives a second authentication. At step 334, the provider computing system 110 receives approval confirmation. At step 336, the provider computing system 110 completes the transaction. In some arrangements, the steps of the method 320 may be performed in a different order than as shown in FIG. 4. For example, step 236 may be performed before step 324. In some arrangements, the method 320 may include more or fewer steps than as shown in FIG. 4.

Referring to the method 320 in more detail, at step 322, the provider computing system 110 receives an indication of an active user session. The active user session may be a user session on a mobile application, a desktop application, a web browser, and so on. The user session may include the user interface described herein, below with respect to FIG. 6. The user session may be configured to enable generating the pre-staged transaction request. In some arrangements, the provider computing system 110 may receive an indication that the user device 160 has executed the user executable 136.

Figures 6A, 6B:
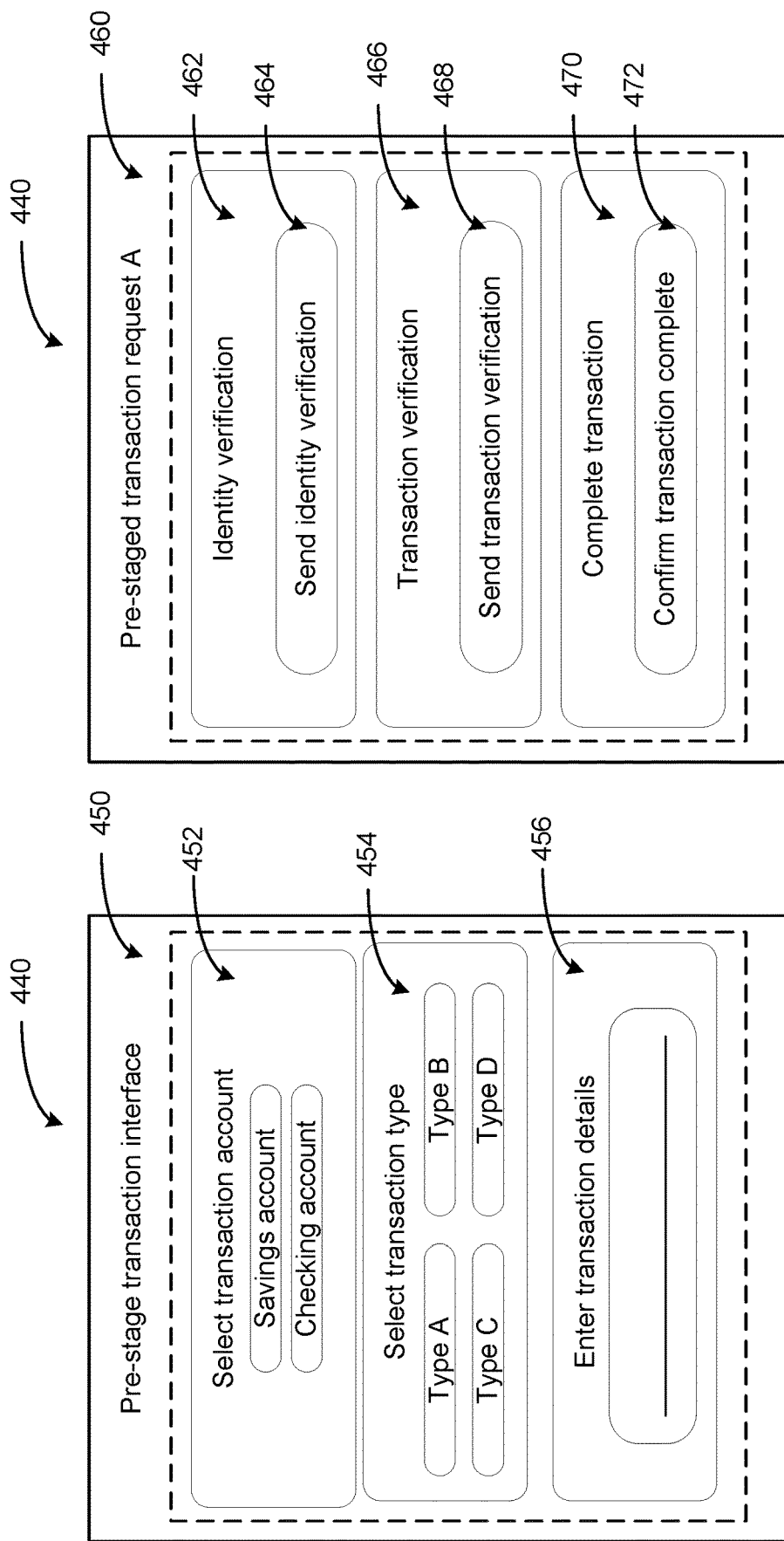
FIG. 6A is an illustration of some aspects of a user device interface showing interactive icons, according to an example arrangement.
FIG. 6B is an illustration of some aspects of the user device interface of FIG. 6A, according to an example arrangement.

At step 324, the provider computing system 110 receives a customer arrival indication. The customer arrival notification may be received from the one or more sensors 180 and/or the one or more I/O devices 190. For example, the one or more sensors 180 may detect (e.g., via a GPS signal received from the user device, via a device pairing request, by a proximity sensor, etc.) that a user device 160 has entered a first geolocation area, where the geolocation area is associated with a physical location of the FI. In some arrangements, when the provider computing system 110 receives the customer arrival indication, the provider computing system automatically causes the user device 160 to enter a branch mode. Software for executing the branch mode may be stored by the provider computing system 110 and/or the user device 160. For example, the user executable 136 may include instructions for executing the branch mode. The branch mode may allow the user device 160 to interact directly with the components of the system 100 and/or enable executing the pre-staged transaction. The branch mode may include a second user interface as shown in FIG. 6B and described herein, below.

At step 236, the provider computing system 110 receives an input of a customer designating transaction details for pre-staging a transaction. The input may be received from the user device 160 and via the network 105. A user may input the transaction information into the user device 160 (e.g., via the user interface shown in FIG. 6A). The customer designating transaction details may include transaction information such as a transaction account, a transaction type, a transaction amount, and so on.

At step 328, the provider computing system 110 confirms the pre-staged transaction. Responsive to receiving the transaction information form the user device 160, the provider computing system 110 may generate a notification indicating that the pre-staged transaction request for the pre-staged transaction has been received. In some arrangements, the notification includes an indication of which transaction device 170 the user should use to complete the pre-staged transaction. In some arrangements, the notification includes an indication of which provider employee will assist the user in completing the pre-staged transaction. In some arrangements, the notification is sent via a mobile application notification (e.g., a "push notification"), a text message (e.g., SMS, MMS, RCS), e-mail, and/or other suitable communication method.

At step 330, the provider computing system 110 receives arrival details. The arrival details may include the first authentication token. As briefly described above, the first authentication token may include an indication that a user has arrived within a second geolocation area associated with a transaction device and/or any other identifying information encoded in the token. In some arrangements, the transaction device is the same transaction device indicated at step 328. The first authentication token may also include a first identity token, which may include an obscured or anonymize identifier associated with the user device, application, session information, and/or user. The first authentication token may be received via the one or more sensors 180 and/or the one or more I/O device 190.

In a first example arrangement, the first authentication token is received in the form of a user voice input. For example, a user may speak into a microphone and verbally provide the first authentication token. For example, the user may verbally provide the transaction ID. In some arrangements, the user may press a button to activate the microphone. In some arrangements, the microphone is provided on the user device 160, on the transaction device 170, or as a stand-alone I/O device 190.

In a second example arrangement, the first authentication token is received in the form of a one-time password (OTP). In some arrangements, the OTP is provided to the user, via the user device 160. The OTP may be generated by the provider computing system 110 and/or the provider device 150 (e.g., using the authentication dataset 132). In some arrangements, the OTP is automatically transmitted to the user device 160 when the provider computing system 110 confirms the pre-staged transaction. In some arrangements, the OTP is manually transmitted to the user device 160 by a provider employee using the provider device 150. In some arrangements, the OTP is entered by the user into the user interface 174 of the transaction device 170. In some arrangements, the OTP is entered by the user into the user interface of the user device 160. In some arrangements, the OTP is entered by the user into one or more I/O devices 190, such as a touchscreen device, a keyboard, a keypad, etc., associated with the transaction device 170.

In a third example arrangement, the first authentication token is received in the form of a communication from the user device 160. For example, a user may "tap" the user device 160 on a NFC device associated with the transaction device 170. In an example arrangement, the "tap" may initiate a wireless communication between the user device 160 and the provider computing system 110. In other arrangements, the user device 160 may additionally and/or alternatively establish communication with the provider device 150, and/or the transaction device 170. Once communication is established, the provider computing system 110 (e.g., the user device management circuit 125) may cause the user device 160 to transmit the first authentication token. In additional and/or alternative arrangements, the user device 160 may include a mobile wallet having a user debit card saved therein. The user device 160 may provide a debit card via the NFC device when the user "taps" the user device 160 to the NFC device.

In a fourth example arrangement, the first authentication token is received in the form of a communication from the user device 160. For example, a user may scan a scannable code (e.g., a quick response code) using a sensor (e.g., camera) of the user device 160. In an example arrangement, scanning the code may cause the user device 160 to initiate a wireless communication between the user device 160 and the provider computing system 110. In other arrangements, the user device 160 may additionally and/or alternatively establish communication with the provider device 150, and/or the transaction device 170. Once communication is established, the provider computing system 110 (e.g., the user device management circuit 125) may cause the user device 160 to transmit the first authentication token.

At step 332, the provider computing system 110 receives a second authentication. The second authentication may be a second authentication token including a second identity token. The second identity token may include one or more of a password, a PIN, a OTP, a biometric scan, an identification card, a picture of the user, a picture of the identification card, and/or other suitable identifying parameters. In some arrangements, the second authentication token may include physically passing one or more identification documents (e.g., a drivers license, a passport, etc.) from the user to a provider employee (e.g., via the transport apparatus 176).

At step 334, the provider computing system 110 receives approval confirmation. The approval confirmation may include an indication that the user approves the pre-staged transaction. In some arrangements, prior to receiving the approval confirmation, the provider computing system 110 causes the user device 160 to display the transaction information. In an example arrangement, the user may provide a confirmation to the provider computing system 110 via the user device 160. For example, the confirmation may be provided by an input to a mobile application, input to a web-based application, a text message, and the like. In some arrangements, the confirmation is received via the I/O devices 190. For example, the confirmation may be provided by verbally via a microphone, a video capture, or other communication method.

At step 336, the provider computing system 110 completes the transaction. For example, the transaction device management circuit 126 may cause the transport apparatus 176 to pass physical transaction media between the provider interface 172 and the user interface 174.

Figures 5A, 5B:
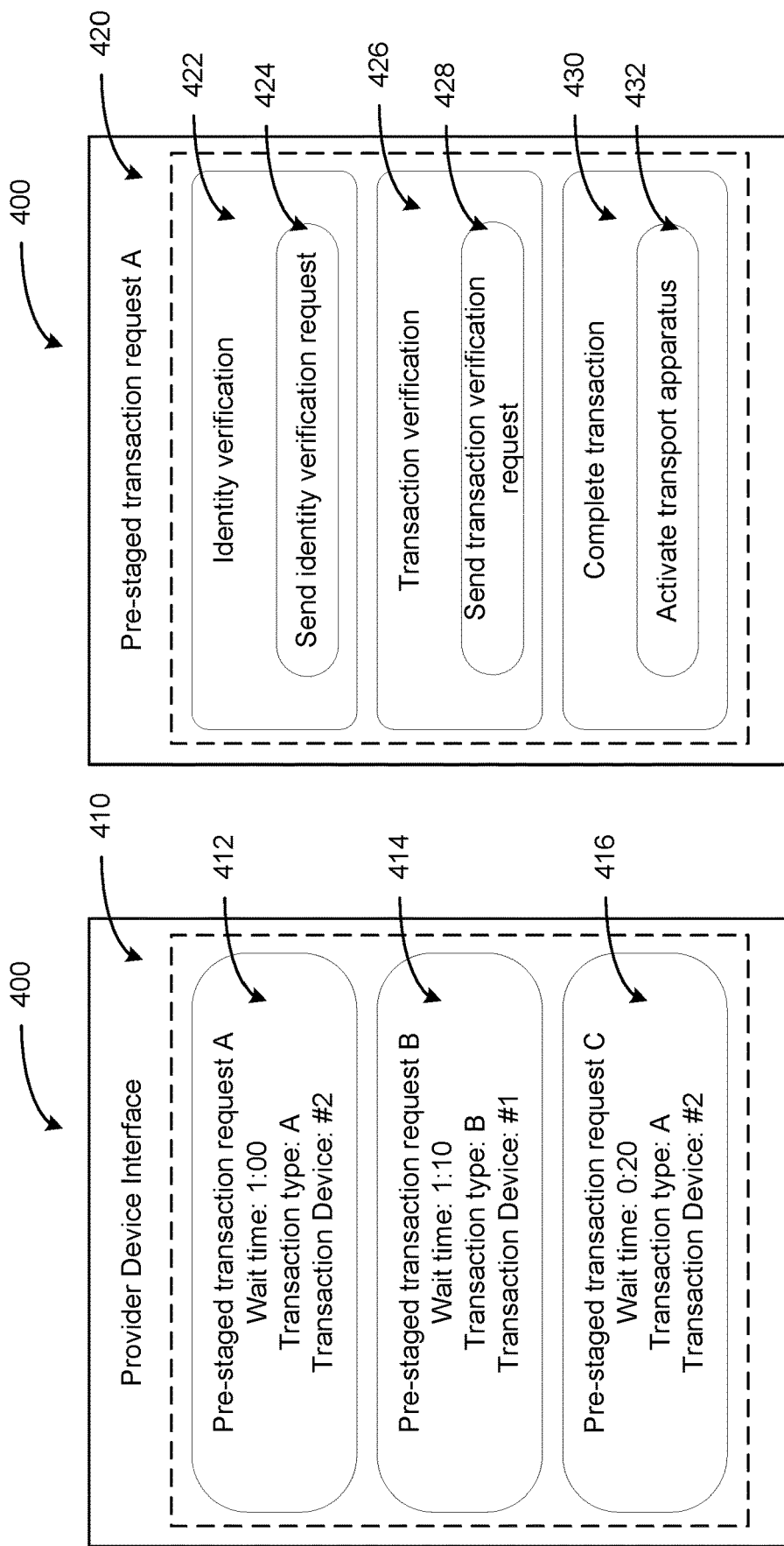
FIG. 5A is an illustration of some aspects of a provider device interface showing interactive elements, according to an example arrangement.
FIG. 5B is an illustration of some aspects of the provider device interface of FIG. 5A, according to an example arrangement.

FIG. 5A is an illustration of some aspects of a provider device interface 400 showing interactive icons, according to an example arrangement. The provider device interface 400 includes a first interface feature 410. The first interface feature 410 may include the teller-specific dynamic service queue. As shown in FIG. 5A, the first interface feature 410 includes one or more interactive icons shown as a first icon 412, a second icon 414, and a third icon 416. It should be understood that the first interface feature 410 may include more or fewer interactive icons than as shown in FIG. 5A.

In some arrangements, each of the interactive icons (e.g., the first icon 412, the second icon 414, and the third icon 416) depict a pre-staged transaction request. For example, the first icon 412 depicts a first pre-staged transaction request shown as "Pre-staged transaction request A". Each icon may depict one or more transaction parameters associated with the pre-staged transaction request. For example and as shown in FIG. 5A, each icon may depict a wait time, a transaction type, and an assigned transaction device. It should be understood that the icons may include more or fewer transaction parameters than as shown in FIG. 5A. In some arrangements, the interactive icons (e.g., the first icon 412, the second icon 414, and the third icon 416) are ordered based on the teller-specific dynamic service queue. For example, the first icon 412 may represent the most urgent and/or the most important pre-staged transaction request. As described above, the provider computing system 110 may determine, based on one or more of the wait time, the transaction type, and/or other transaction parameters, the urgency and/or importance of each pre-staged transaction request, and the provider computing system 110 may order the -staged transaction requests based on the determination.

FIG. 5B is an illustration of some aspects of the provider device interface 400 of FIG. 5A, according to an example arrangement. The provider device interface 400 includes a second interface feature 420. The second interface feature 420 may include an interface for enabling a pre-staged transaction. As shown in FIG. 5B, the second interface feature 420 includes one or more interactive features shown as a first feature 422, a second feature 416, and a third feature 430. It should be understood that the second interface feature 420 may include more or fewer interactive features than as shown in FIG. 5B.

The first feature 422 may include a first interactive feature 424. The first feature 422 may depict information related to verifying an identity of a user device 160 and/or an identity of a user associated with the user device 160. For example, the first feature 422 may depict options that the user has pre-approved for verifying the user's identity, such as an identity token (described herein, above). In some arrangements, a provider employee may interact with the first interactive feature 424 to cause the user device 160 to capture and/or transmit the identity token. In some arrangements, selecting the first interactive feature 424 causes the provider computing system 110 to generate an OTP and provide the OTP to the user device 160.

The second feature 426 may include a second interactive feature 428. The second feature 426 may depict information related to verifying the pre-staged transaction. For example, the second feature 426 may depict transaction details such as an account number, a transaction type, and so on. In some arrangements, a provider employee may interact with the second interactive feature 428 to cause the user device 160 to display and/or transmit a transaction verification.

The third feature 430 may include a third interactive feature 432. The third feature 430 may depict information related to completing the pre-staged transaction. For example, the third feature 430 may depict steps for completing the pre-staged transaction. In some arrangements, a provider employee may interact with the third interactive feature 432 to cause the transport apparatus 176 of the transaction device 170 to transport transaction media between the user and the provider employee.

FIG. 6A is an illustration of some aspects of a user device interface 440 showing interactive icons, according to an example arrangement. The user device interface 440 includes a first interface feature 450. The first interface feature 450 may include a pre-staged transaction request form. As shown in FIG. 6A, the first interface feature 450 includes one or more interactive icons shown as a first icon 452, a second icon 454, and a third icon 456. It should be understood that the first interface feature 450 may include more or fewer interactive icons than as shown in FIG. 6A.

In some arrangements, each of the interactive icons (e.g., the first icon 452, the second icon 454, and the third icon 456) depict steps to complete a pre-staged transaction request. The first icon 452 may involve selecting and/or inputting an account for the pre-staged transaction. For example, the user may select between a checking and savings account. The second icon 454 may include selecting a transaction type. For example, the user may select from a list of transaction types. The third icon 465 may include inputting and/or selecting transaction details, such as a transaction amount. For example, the user may input, via a keyboard, a transaction amount.

FIG. 6B is an illustration of some aspects of the user device interface 440 of FIG. 6A, according to an example arrangement. The user device interface 440 includes a second interface feature 460. The second interface feature 460 may include an interface for enabling a pre-staged transaction. As shown in FIG. 6B, the second interface feature 460 includes one or more interactive features shown as a first feature 462, a second feature 466, and a third feature 470. It should be understood that the second interface feature 460 may include more or fewer interactive features than as shown in FIG. 6B. In some arrangements, the second interface feature 460 is displayed when the user device 160 is caused to enter a branch mode.

The first feature 462 may include a first interactive feature 464. The first feature 462 may depict information related to verifying an identity of a user device 160 and/or an identity of a user associated with the user device 160. In an example arrangement, the first feature 462 may be inactive until a provider employee sends a request for identity verification. In some arrangements, the first feature 462 is always active. When the first feature 462 is active, a user may select the first interactive feature 464 to input and/or send the identity verification (e.g., identity token). In some arrangements, selecting the first interactive feature 464 may cause the user device 160 to capture a voice recording, capture a picture, receive a user input (e.g., a password, an OTP, and the like) or other data related to the identity verification. In some arrangements, selecting the first interactive feature 464 may cause the user device 160 to transmit the identity verification to the provider computing system 110.

The second feature 466 may include a second interactive feature 468. The second feature 466 may depict information related to verifying the pre-staged transaction. For example, the second feature 466 may depict transaction details such as an account number, a transaction type, and so on. In an example arrangement, the second feature 466 may be inactive until a provider employee sends a request for transaction verification. In some arrangements, the second feature 466 is always active. When the second feature 466 is active, user may interact with the second interactive feature 468 to cause the user device 160 to transmit a transaction verification.

The third feature 470 may include a third interactive feature 472. The third feature 470 may depict information related to completing the pre-staged transaction. For example, the third feature 470 may depict steps for confirming that the pre-staged transaction has been completed. In an example arrangement, the third feature 470 may be inactive until a provider employee sends an indication that the transaction is completed. In some arrangements, the third feature 470 is always active. In some arrangements, a user employee may interact with the third interactive feature 472 to send a notification to the provider computing system 110 that the user has confirmed that the pre-staged transaction is complete.

Figure 7:
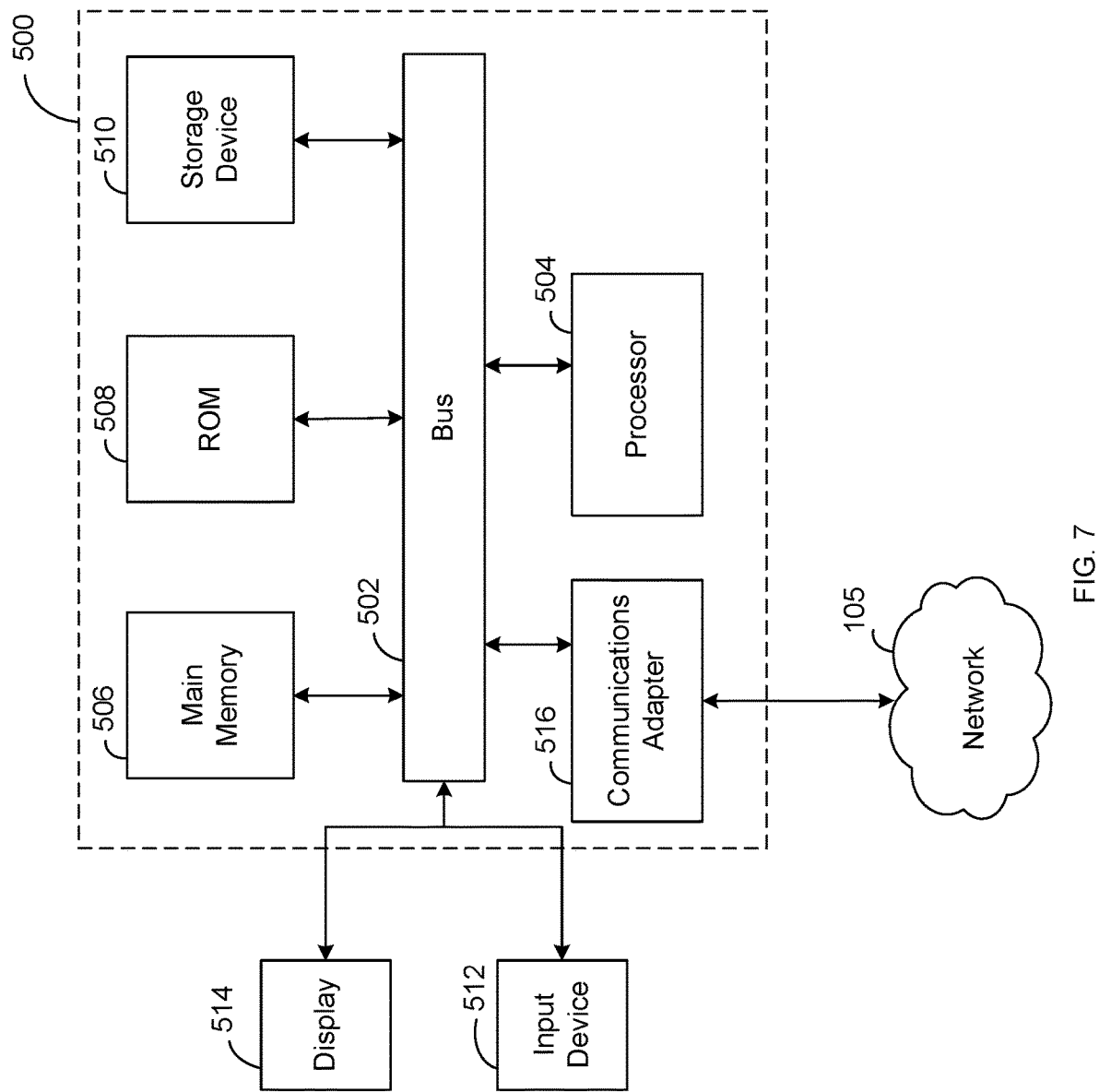
FIG. 7 is a component diagram of an example computing system suitable for use in the various arrangements described herein, according to an example arrangement.

FIG. 7 is a component diagram of an example computing system suitable for use in the various arrangements described herein, according to an example arrangement. For example, the computing system 500 may implement an example provider computing system 110, a provider device 150, a user device 160, and/or various other example systems and devices described in the present disclosure.

The computing system 500 includes a bus 502 or other communication component for communicating information and a processor 504 coupled to the bus 502 for processing information. The computing system 500 also includes main memory 506, such as a random access memory (RAM) or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a read only memory (ROM) 508 or other static storage device coupled to the bus 402 for storing static information and instructions for the processor 504. A storage device 510, such as a solid state device, magnetic disk or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information, and command selections to the processor 504. In another arrangement, the input device 512 has a touch screen display. The input device 512 can include any type of biometric sensor, a cursor control, such as a mouse, a trackball, or cursor direction keys, for communicating direction information and command selections to the processor 504 and for controlling cursor movement on the display 514.

In some arrangements, the computing system 500 may include a communications adapter 516, such as a networking adapter. Communications adapter 516 may be coupled to bus 502 and may be configured to enable communications with a computing or communications network 105 and/or other computing systems. In various illustrative arrangements, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various arrangements, the processes that effectuate illustrative arrangements that are described herein can be achieved by the computing system 500 in response to the processor 504 executing an arrangement of instructions contained in main memory 506. Such instructions can be read into main memory 506 from another computer-readable medium, such as the storage device 510. Execution of the arrangement of instructions contained in main memory 506 causes the computing system 500 to perform the illustrative processes described herein. One or more processors in a multi-processing arrangement may also be employed to execute the instructions contained in main memory 506. In alternative arrangements, hard-wired circuitry may be used in place of or in combination with software instructions to implement illustrative arrangements. Thus, arrangements are not limited to any specific combination of hardware circuitry and software.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
one or more sensors;
one or more processors; and
memory having instructions stored in non-transitory machine-readable media that, when executed by the one or more processors, cause the one or more processors to:
receive, by a user device management circuit, a pre-staged transaction request for a pre-staged transaction, from a user device;
detect, by the one or more sensors, that the user device has entered a first geolocation area;
cause, by the user device management circuit and responsive to detecting that the user device has entered the first geolocation area, the user device to enter a branch mode by causing the user device to run an executable, the user device displaying a branch mode user interface when running the executable;
determine, by a provider team management circuit, a real-time status of a first provider employee of a plurality of provider employees based on determining whether the first provider employee will be available within a predetermined time period, the predetermined time period based on a transaction type and an amount of time a user associated with the pre-staged transaction has already been waiting;
select, by the provider team management circuit, the first provider employee to process the pre-staged transaction responsive to determining that first provider employee will be available within the predetermined time period;
add, by a provider device management circuit, the pre-staged transaction to a dynamic service queue based on the transaction type and the amount of time, the dynamic service queue corresponding to the first provider employee, wherein the dynamic service queue comprises a plurality of pre-staged transactions;
order, by the provider device management circuit, each pre-staged transaction request of the plurality of pre-staged transaction requests in the dynamic service queue based on:
a duration that each pre-staged transaction request of the plurality of pre-staged transaction requests has been in the dynamic service queue; and
a priority characteristic of a type of transaction of each pre-staged transaction request of the plurality of pre-staged transaction requests;
display, by the provider device management circuit, a teller user interface on a teller device, the teller user interface comprising at least the dynamic service queue;
verify, by an authentication circuit, the pre-staged transaction, wherein verifying the pre-staged transaction comprises:
receiving one or more identity tokens corresponding to the user;
causing the user device to display information regarding the pre-staged transaction;
causing a first interactive feature of the branch mode user interface to change from an inactive state to an active state, the first interactive feature being selectable when in the active state; and
receiving, from the user device, via a user selection of the first interactive feature, a transaction approval;
responsive to verifying the pre-staged transaction, complete, by a transaction device management circuit, the pre-staged transaction;
cause, by the user device management circuit and responsive to completing the transaction, a second interactive feature of the branch mode user interface to change from the inactive state to the active state, the second interactive feature being selectable when in the active state; and
receive, from the user device via a second user selection the second interactive feature on the branch mode user interface, a transaction confirmation.

2. The system of claim 1, wherein the one or more sensors comprise at least one of:
a positioning sensor structured to determine a geolocation to the user device; and
a wireless transceiver structured to communicatively couple to the user device, when the user device is within the first geolocation area.

3. The system of claim 1, wherein the instructions further cause the one or more processors to generate a physical document associated with the pre-staged transaction.

4. The system of claim 1, wherein the instructions further cause the one or more processors to:
receive, by a first input/output device, an indication that the user device is at a first transaction device, wherein receiving the indication comprises at least one of:
detecting, by the one or more sensors that the user device is within a second geolocation area, the second geolocation area corresponding to the first transaction device; and
receiving, by a first sensor of the one or more sensors, a user input comprising at least one of: a voice input, a biometric input, a visual input, and a security token input, wherein the first sensor is positioned proximally to the first transaction device.

5. The system of claim 1, wherein verifying, by the authentication device, the pre-staged transaction comprises:
generating a first verification token;
providing the first verification token to the user device;
receiving a second verification token;
verifying the pre-staged transaction based on the second verification token corresponding to a corresponding authentication dataset;
responsive to verifying the pre-staged transaction, storing the second verification token in a verification database.

6. The system of claim 1, wherein determining, by the provider team management circuit, the first provider employee to process the pre-staged transaction comprises:
determining real-time statuses for each of a plurality of provider employees;
identifying team member attributes for each of the plurality of provider employees; and
selecting, based on the team member attributes and the real-time statuses, the first provider employee from the plurality of provider employees to process the pre-staged transaction.

7. A computer implemented method of executing pre-staged transactions comprising:
receiving, by a user device management circuit, a pre-staged transaction request for a pre-staged transaction, from a user device;
detecting, by one or more sensors, that the user device has entered a first geolocation area;
causing, by the user device management circuit and responsive to detecting that the user device has entered the first geolocation area, the user device to enter a branch mode by causing the user device to run an executable, the user device displaying a branch mode user interface when running the executable;
determining, by a provider team management circuit, a real-time status of a first provider employee of a plurality of provider employees based on determining whether the first provider employee will be available within a predetermined time period, the predetermined time period based on a transaction type and an amount of time a user associated with the pre-staged transaction has already been waiting;
selecting, by the provider team management circuit, the first provider employee to process the pre-staged transaction responsive to determining that first provider employee will be available within the predetermined time period;
adding, by a provider device management circuit, the pre-staged transaction to a dynamic service queue based on the transaction type and the amount of time, the dynamic service queue corresponding to the first provider employee, wherein the dynamic service queue comprises a plurality of pre-staged transactions;
ordering, by the provider device management circuit, each pre-staged transaction request of the plurality of pre-staged transaction requests in the dynamic service queue based on:
a duration that each pre-staged transaction request of the plurality of pre-staged transaction requests has been in the dynamic service queue; and
a priority characteristic of a type of transaction of each pre-staged transaction request of the plurality of pre-staged transaction requests;
displaying, by the provider device management circuit, a teller user interface on a teller device, the teller user interface comprising at least the dynamic service queue;
verifying, by an authentication circuit, the pre-staged transaction, wherein verifying the pre-staged transaction comprises:
receiving one or more identity tokens corresponding to the user;
causing the user device to display information regarding the pre-staged transaction;
causing a first interactive feature of the branch mode user interface to change from an inactive state to an active state, the first interactive feature being selectable when in the active state; and
receiving, from the user device, via a user selection of the first interactive feature, a transaction approval;
responsive to verifying the pre-staged transaction, completing, by a transaction device management circuit, the pre-staged transaction;
causing, by the user device management circuit and responsive to completing the transaction, a second interactive feature of the branch mode user interface to change from the inactive state to the active state, the second interactive feature being selectable when in the active state; and
receiving, from the user device via a second user selection the second interactive feature on the branch mode user interface, a transaction confirmation.

8. The method of claim 7, wherein the one or more sensors comprise at least one of:
a positioning sensor structured to determine a geolocation to the user device; and
a wireless transceiver structured to communicatively couple to the user device, when the user device is within the first geolocation area.

9. The method of claim 7, further comprising generating a physical document associated with the pre-staged transaction.

10. The method of claim 7, further comprising receiving, by a first input/output device, an indication that the user device is at a first transaction device, wherein receiving the indication comprises at least one of:
detecting, by the one or more sensors that the user device is within a second geolocation area, the second geolocation area corresponding to the first transaction device; and
receiving, by a first sensor of the one or more sensors, a user input comprising at least one of: a voice input, a biometric input, a visual input, and a security token input, wherein the first sensor is positioned proximally the first transaction device.

11. The method of claim 7, wherein verifying, by the authentication device, the pre-staged transaction comprises:
generating a first verification token;
providing the first verification token to the user device;
receiving a second verification token;
verifying the pre-staged transaction based on the second verification token corresponding to a corresponding authentication dataset;
responsive to verifying the pre-staged transaction, storing the second verification token in a verification database.

12. The method of claim 7, wherein determining, by the provider team management circuit, the first provider employee to process the pre-staged transaction comprises:
determining real-time statuses for each of a plurality of provider employees;
identifying team member attributes for each of the plurality of provider employees; and selecting, based on the team member attributes and the real-time statuses, the first provider employee from the plurality of provider employees to process the pre-staged transaction.

13. Non transitory computer readable media having computer executable instructions embodied therein that, when executed by at least one processor of a computing system, cause the computing system to perform operations for executing pre-staged transactions, the operations comprising:
receive, by a user device management circuit, a pre-staged transaction request for a pre-staged transaction, from a user device;
detect, by one or more sensors, that the user device has entered a first geolocation area;
cause, by the user device management circuit and responsive to detecting that the user device has entered the first geolocation area, the user device to enter a branch mode by causing the user device to run an executable, the executable stored at the user device, the user device displaying a branch mode user interface when running the executable, the branch mode user interface including a plurality of interactive features;
determine, by a provider team management circuit, a real-time status of a first provider employee of a plurality of provider employees based on determining whether the first provider employee will be available within a predetermined time period, the predetermined time period based on a transaction type and an amount of time a user associated with the pre-staged transaction has already been waiting;
select, by the provider team management circuit, the first provider employee to process the pre-staged transaction responsive to determining that first provider employee will be available within the predetermined time period;
add, by a provider device management circuit, the pre-staged transaction to a dynamic service queue based on the transaction type and the amount of time, the dynamic service queue corresponding to the first provider employee, wherein the dynamic service queue comprises a plurality of pre-staged transactions;
order, by the provider device management circuit, each pre-staged transaction request of the plurality of pre-staged transaction requests in the dynamic service queue based on:
a duration that each pre-staged transaction request of the plurality of pre-staged transaction requests has been in the dynamic service queue; and
a priority characteristic of a type of transaction of each pre-staged transaction request of the plurality of pre-staged transaction requests;
display a teller user interface on a teller device, the teller user interface comprising at least the dynamic service queue;
verify, by an authentication circuit, the pre-staged transaction, wherein verifying the pre-staged transaction comprises:
receiving one or more identity tokens corresponding to the user;
causing the user device to display information regarding the pre-staged transaction, wherein causing the user device to display the information regarding the pre-staged transaction causes a first interactive feature of the plurality of interactive features to change from an inactive state to an active state, the first interactive feature being selectable when in the active state, and
receiving, from the user device, via a first user selection of the first interactive feature on the branch mode user interface, a transaction approval, the transaction approval received responsive to displaying the information regarding the pre-staged transaction;
responsive to verifying the pre-staged transaction, complete, by a transaction device management circuit, the pre-staged transaction;
cause, by the user device management circuit and responsive to completing the transaction, the user device to display an indication that the transaction is completed, wherein causing the user device to display the indication causes a second interactive feature of the plurality of interactive features to change from the inactive state to the active state, the second interactive feature being selectable when in the active state; and
receive, from the user device via a second user selection the second interactive feature on the branch mode user interface, a transaction confirmation.

14. The operations of claim 13, wherein the one or more sensors comprise at least one of:
a positioning sensor structured to determine a geolocation to the user device; and
a wireless transceiver structured to communicatively couple to the user device, when the user device is within the first geolocation area.

15. The operations of claim 13, further comprising:
generate a physical document associated with the pre-staged transaction;
receive, by a first input/output device, an indication that the user device is at a first transaction device, wherein receiving the indication comprises at least one of:
detecting, by the one or more sensors that the user device is within a second geolocation area, the second geolocation area corresponding to the first transaction device; and
receiving, by a first sensor of the one or more sensors, a user input comprising at least one of: a voice input, a biometric input, a visual input, and a security token input, wherein the first sensor is positioned proximally the first transaction device.

16. The operations of claim 15, wherein verifying, by the authentication device, the pre-staged transaction comprises:
generating a first verification token;
providing the first verification token to the user device;
receiving a second verification token;
verifying the pre-staged transaction based on the second verification token corresponding to a corresponding authentication dataset;
responsive to verifying the pre-staged transaction, storing the second verification token in a verification database.

17. The operations of claim 16, wherein determining, by the provider team management circuit, the first provider employee to process the pre-staged transaction comprises:
determining real-time statuses for each of a plurality of provider employees;
identifying team member attributes for each of the plurality of provider employees; and
selecting, based on the team member attributes and the real-time statuses, the first provider employee from the plurality of provider employees to process the pre-staged transaction.

* * * * *